US011304185B2

(12) United States Patent
Zhou et al.

(10) Patent No.: US 11,304,185 B2
(45) Date of Patent: Apr. 12, 2022

(54) BANDWIDTH PART (BWP) SWITCHING DELAYS FOR NEW RADIO (NR)

(71) Applicant: Apple Inc., Cupertino, CA (US)

(72) Inventors: Yuhan Zhou, Santa Clara, CA (US); Jie Cui, Santa Clara, CA (US); Yang Tang, San Jose, CA (US); Rui Huang, Beijing (CN); Hua Li, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/410,985

(22) Filed: May 13, 2019

(65) Prior Publication Data

US 2019/0268905 A1     Aug. 29, 2019

Related U.S. Application Data

(60) Provisional application No. 62/671,261, filed on May 14, 2018.

(51) Int. Cl.
*H04W 72/04* (2009.01)
*H04W 88/08* (2009.01)

(52) U.S. Cl.
CPC ..... *H04W 72/042* (2013.01); *H04W 72/0446* (2013.01); *H04W 88/08* (2013.01)

(58) Field of Classification Search
CPC .................................................. H04W 72/042
See application file for complete search history.

(56) References Cited

U.S. PATENT DOCUMENTS

| 2019/0104543 | A1* | 4/2019 | Park | H04L 1/001 |
| 2019/0254056 | A1* | 8/2019 | Salah | H04W 72/1263 |
| 2019/0261405 | A1* | 8/2019 | Ang | H04L 5/0096 |
| 2019/0313410 | A1* | 10/2019 | Yang | H04W 72/0453 |
| 2020/0266959 | A1* | 8/2020 | Yl | H04W 74/0833 |

OTHER PUBLICATIONS

The specification of U.S. Appl. No. 62/572,534, filed Oct. 15, 2017 (Year: 2017).*
3GPP, "Technical Specification Group Radio Access Network; NR; Physical channels and modulation (Release 15)," 3GPP TS 38.211 V15.1.0 (Mar. 2018), 5G, 90 pages.
3GPP, "Technical Specification Group Radio Access Network; NR; Physical layer procedures for control (Release 15)," 3GPP TS 38.213 V15.1 0 (Mar. 2018), 5G, 77 pages.
3GPP, "Technical Specification Group Radio Access Network; NR; Requirements for support of radio resource management (Release 15)," 3GPP TS 38.133 V15.1.0 (Mar. 2018), 5G, 59 pages.

* cited by examiner

*Primary Examiner* — Jason E Mattis
(74) *Attorney, Agent, or Firm* — Sterne, Kessler, Goldstein & Fox P.L.L.C.

(57) ABSTRACT

Methods, systems, and storage media are described for bandwidth part (BWP) switching delays for new radio (NR). Other embodiments may be described and/or claimed.

20 Claims, 14 Drawing Sheets

200

Receiving a message comprising bandwidth part (BWP) configuration information, the BWP configuration information for indicating a number of slots for a BWP switch delay
205

Performing a BWP switch based on the BWP configuration information

210

300 

Generating a first message comprising an initial bandwidth part (BWP) configuration
305

Encoding the first message for transmission to a user equipment (UE)
310

Generating a second message comprising BWP reconfiguration information, the BWP reconfiguration information for indicating a number of slots for a BWP switch delay
315

Encoding the second message for transmission to the UE
320

FIG. 3

BANDWIDTH PART (BWP) SWITCHING DELAYS FOR NEW RADIO (NR)

RELATED APPLICATION

The present application claims priority under 35 U.S.C. § 119 to: U.S. Provisional Application No. 62/671,261 filed May 14, 2018, the contents of which are hereby incorporated by reference in its entirety.

FIELD

Various embodiments of the present application generally relate to the field of wireless communications, and in particular, to bandwidth part (BWP) switching delays in new radio (NR).

BACKGROUND

Among other things, embodiments of the present disclosure relate to a BWP switching delay that is expressed when sub-carrier spacing (SCS) changes. Embodiments herein may use a slot as the unit for the bandwidth part (BWP) switching delay. Furthermore, the present disclosure describes interruptions to the current serving component carrier and other serving carriers due to BWP switching.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figure 1:
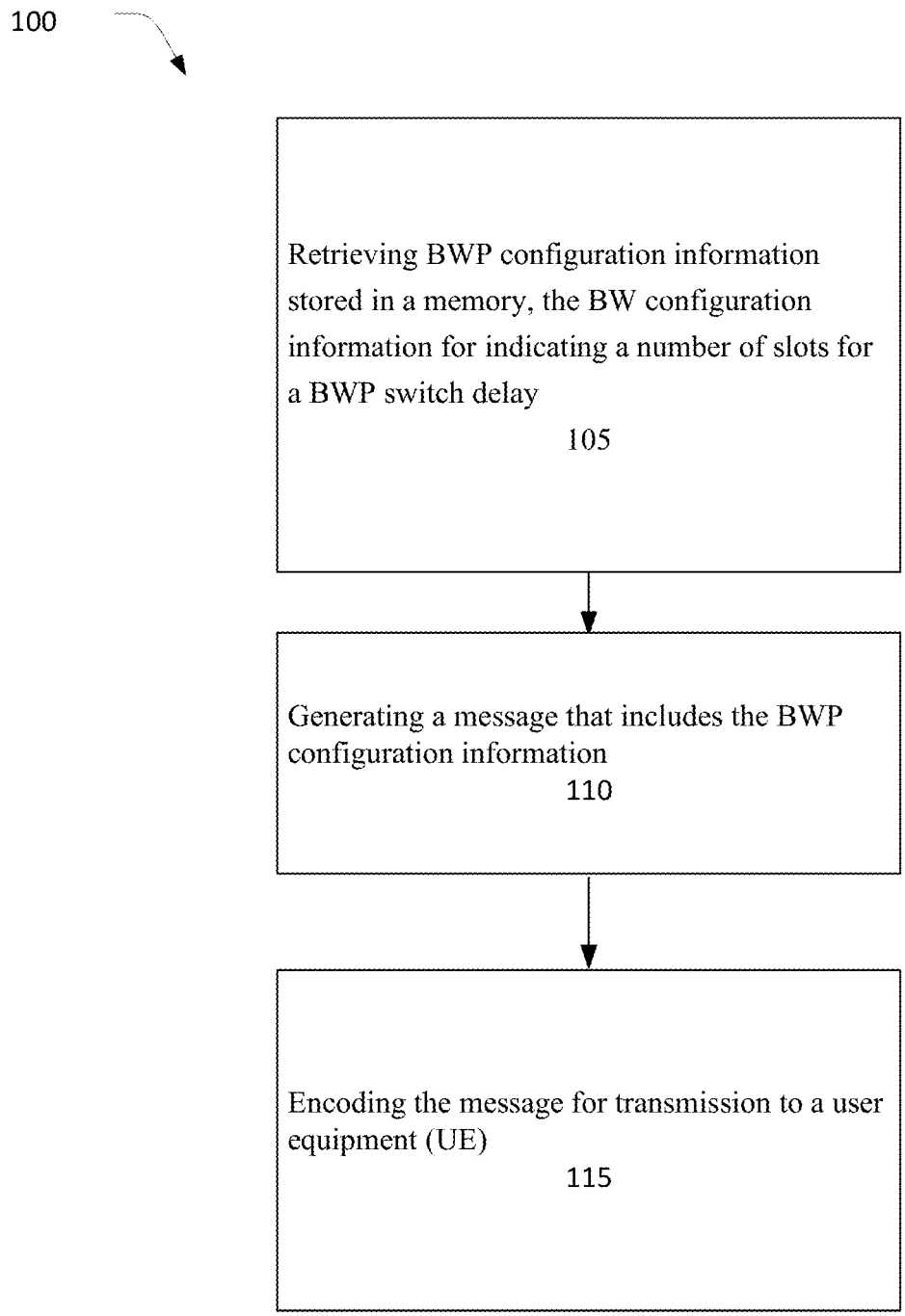

Embodiments discussed herein may relate to bandwidth part (BWP) switching delays in new radio (NR). Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Bandwidth Part (BWP) Switching Delays for New Radio (NR)

Figure 4A:
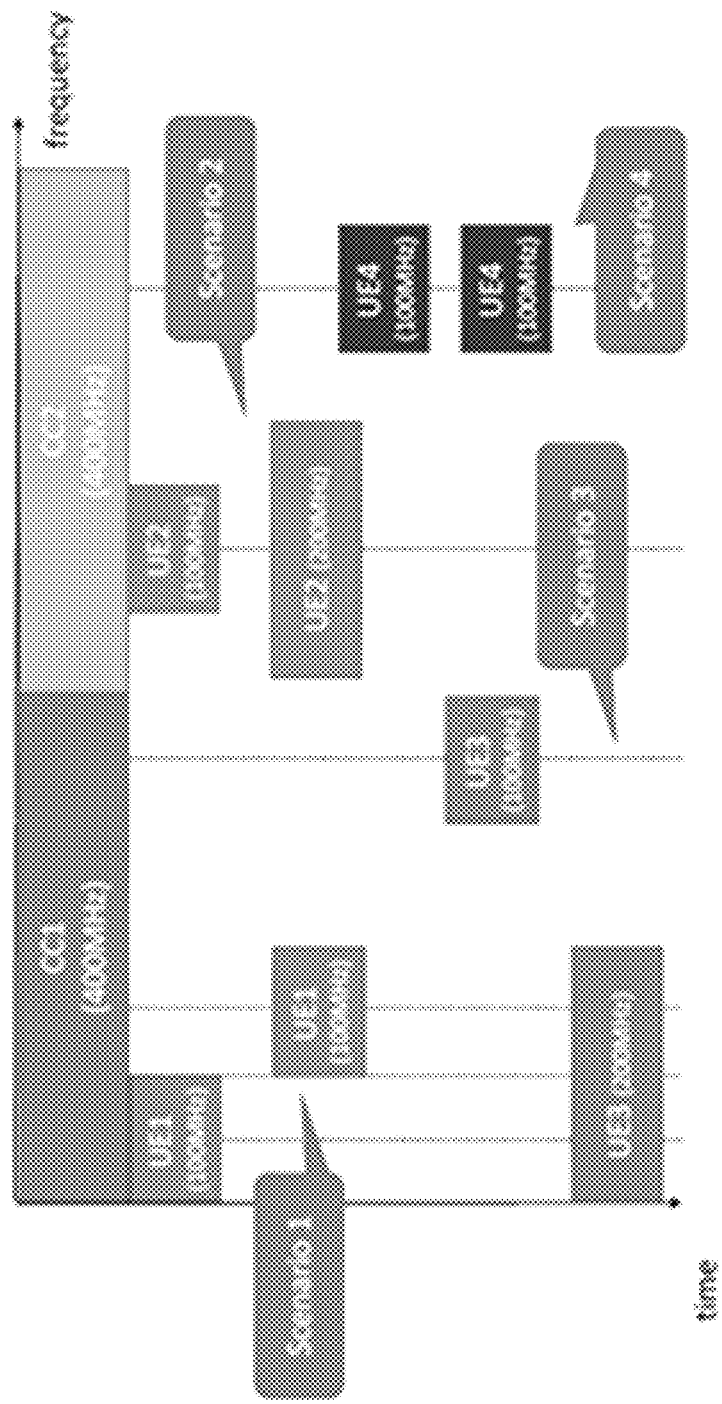
FIG. 4A illustrates an example of BWP configuration scenarios in accordance with some embodiments.

Embodiments of the present disclosure may be utilized in conjunction with a variety of BWP reconfiguration scenarios and their associated switching delays. FIG. 4A, for example, illustrates some examples of BWP reconfiguration scenarios and associated switching delays. In this example, "Scenario 1" depicts a reconfiguration that involves changing the center frequency of the BWP without changing its bandwidth (BW). The reconfiguration in Scenario 1 may or may not involve changing the subcarrier spacing (SCS).

The "Scenario 2" example in FIG. 4A involves changing the BW of the BWP without changing its center frequency. The reconfiguration may or may not involve changing the SCS. In "Scenario 3," the reconfiguration involves changing both the BW and the center frequency of the BWP. The reconfiguration may or may not involve changing the SCS. In "Scenario 4," the reconfiguration involves changing only the SCS, where the center frequency and BW of the BWP remain unchanged.

In some embodiments, a UE may not be expected to receive downlink (DL) signals or transmit uplink (UL) signals during the transition time of active DL or UL BWP switch. For example, for a Downlink Control Information (DCI)-based active BWP switch, from a RAN1 perspective, the transition time of active DL or UL BWP switch may be the time duration from the end of last Orthogonal Frequency Division Multiplexed (OFDM) symbol of the Physical Downlink Control CHannel (PDCCH) carrying the active BWP switch DCI until the beginning of a slot indicated by K0 in the active DL BWP switch DCI or K2 in the active UL BWP switch DCI.

In some embodiments, for a timer-based active BWP switch from a RAN1 perspective, the transition time of active DL or UL BWP switch is the time duration from the beginning of the subframe (FR1) or from the beginning of the half-subframe (FR2) immediately after a BWP timer expires until the beginning of a slot user equipment (UE) is able to receive DL signals or transmit UL signals in the default DL BWP for paired spectrum or the default DL or UL BWP for unpaired spectrum. In some embodiments, a UE may not be expected to receive a DCI indicating active DL (UL) BWP change in OFDM symbols other than the first 3 OFDM symbols of a slot.

For some embodiments, a BWP switching time with a relatively fine regularity in terms of symbols may be beneficial when Physical Downlink Shared CHannel (PDSCH) mapping type B is employed, where non-slot based scheduling for PDSCH with 2, 4 or 7 symbols. However, it is may be suitable in some embodiments for the interruption duration to be in the unit of slot.

In some embodiments, it may be suitable to define the interruption duration in terms of slots. If the interruption duration is expressed in the unit of symbol, the interruption may vary according to different symbol lengths, which may not be desirable. For Physical Sidelink Discovery Channel (PSDCH) mapping type A ("slot-based" scheduling), Demodulation Reference Signals (DMRS) are fixed to $3^{rd}$ or $4^{th}$ symbol of the slot. Since DCI only locates within the first 3 symbols of a slot, so that means that symbols available after BWP switch in a slot cannot be scheduled for PDSCH with PSDCH mapping type A, due to the lack of DMRS information.

The symbol length and Cyclic Prefix (CP) length may defined as follows:

$$N_u^\mu = 2048\kappa \cdot 2^{-\mu}$$

$$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^\mu \\ 144\kappa \cdot 2^{-\mu} & \text{normal cyclic prefix, } l \neq 0 \text{ and } l \neq 7 \cdot 2^\mu \end{cases}$$

Table 1 below illustrates an example of the symbol and CP length in the order of a "microsecond," (sometimes shortened to µs).

TABLE 1

Symbol and CP length for NR

| SCS | OFDM symbol length | CP length (l = 0 or l = 7*2^(u)) | CP length (l ≠ 0 or l ≠ 7*2^(u)) | Total OTA symbol length (l = 0 or l = 7*2^(u)) | Total OTA symbol length (l ≠ 0 or l ≠ 7*2^(u)) |
|---|---|---|---|---|---|
| 15 kHz | 66.7 us | 5.2 us | 4.7 us | 71.9 us | 71.4 us |
| 30 kHz | 33.3 us | 2.9 us | 2.4 us | 36.2 us | 35.7 us |
| 60 kHz (normal CP) | 16.7 us | 1.7 us | 1.2 us | 18.4 us | 17.9 us |
| 60 kHz (extended CP) | 16.7 us | 4.2 us | 4.2 us | 20.9 us | 20.9 us |
| 120 kHz | 8.3 us | 1.1 us | 0.6 us | 9.4 us | 8.9 us |

In some embodiments, the BWP switching time delay requirement may be designed in number of slots instead of symbols. With the time unit of slots, the interruption time due to BWP switch may not occupy any symbol for DMRS for PDSCH mapping type A or PDSCH mapping type B. Thus, the BWP switch interruption has no impact on the channel estimation. However, the interruption due to BWP switching may have an impact on measurements. Since the Single Side Band (SSB) for measurement occurs every SS/PBCH block measurement timing configuration (SMTC) period, the BWP switching interruption time could potentially collide with the SSB, which could lead UE misses the SSB for measurements. As a result, UE may require a longer time to accomplish measurements.

In some embodiments, when a BWP switching delay is expressed in the unit of a slot, the BWP switch delay may not have impact on channel estimation. In some embodiments, when the BWP switching delay is expressed in the unit of a slot, the BWP switch delay may have impact on measurement and results in a longer time for measurement.

Figure 4B:
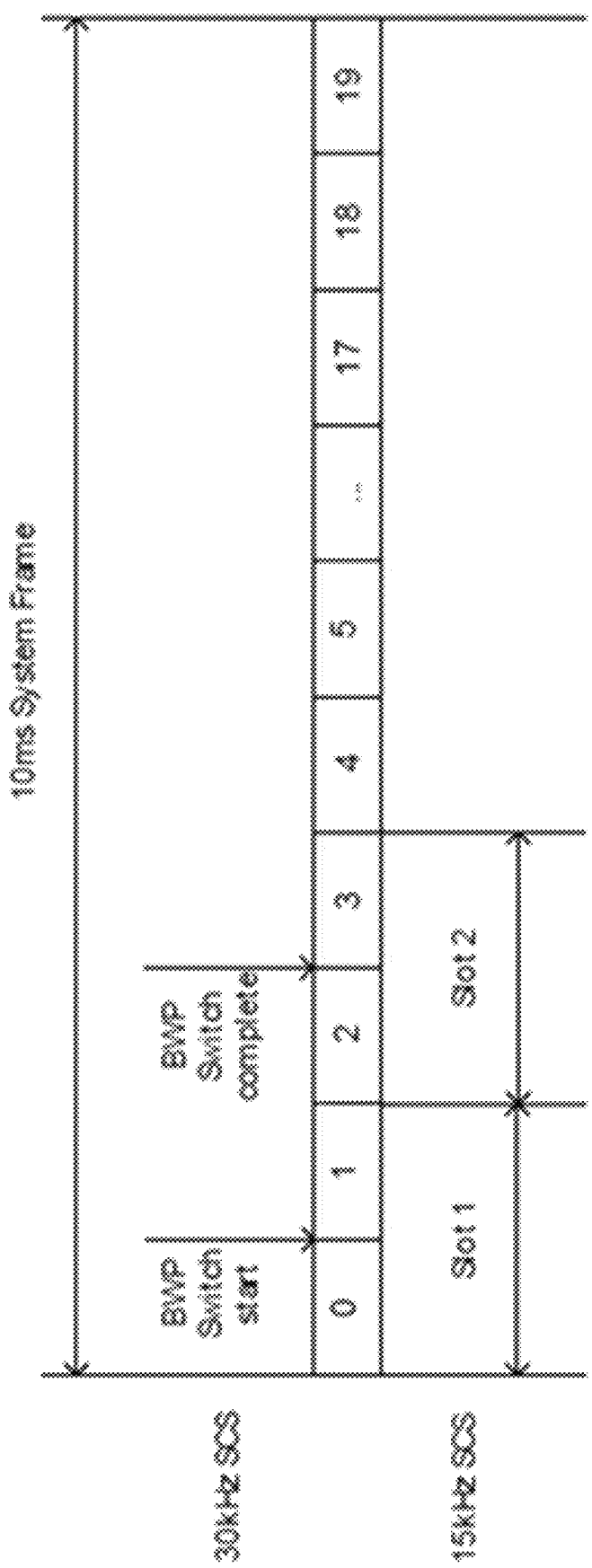
FIG. 4B illustrates an example of BWP switching in accordance with some embodiments.

Another issue is the case when BWP switch results in a change from $SCS_1$ to $SCS_2$. FIG. 4B illustrates an example of a BWP switch. In this example, the BWP switches from a 30 kHz SCS to a 15 kHz SCS. In this example, the BWP switching delay is 1 ms for the 30 kHz SCS, and 2 ms for the 15 kHz SCS. Thus for this case, the BWP switching delay should be expressed with 0.5 ms slot for 30 kHz SCS, otherwise, there may be one 0.5 ms slot wasted, which can be scheduled by gNB for data transmission.

In some embodiments, if the BWP switch results in the change of the SCS from $SCS_1$ to $SCS_2$, the BWP switching delay may be expressed in the time unit of slots corresponding to the largest SCS between $SCS_1$ and $SCS_2$.

For E-UTRAN New Radio-Dual Connectivity (EN-DC) or new radio (NR) Carrier Aggregation (CA), the possible interruption for BWP switching could further be specified into the following cases:
1) Whether BWP switching in FR2 NR cell causes interruption to LTE cell;
2) Whether BWP switching in FR1 NR inter-band cell causes interruption to LTE cell;
3) Whether BWP switching in FR1 NR intra-band cell causes interruption to LTE cell;
4) Whether BWP switching on FR1 NR component carrier (CC) causes interruption to FR2 NR carrier;
5) Whether BWP switching on FR1 NR CC causes interruption to FR1 NR inter-band carrier;
6) Whether BWP switching on FR1 NR CC causes interruption to FR1 NR intra-band carrier;
7) Whether BWP switching on FR2 NR CC causes interruption to FR1 NR carrier;
8) Whether BWP switching on FR2 NR CC causes interruption to FR2 NR inter-band carrier; or
9) Whether BWP switching on FR2 NR CC causes interruption to FR2 NR intra-band carrier.

For the intra-band case (e.g., cases 3, 6, and 9 above), when the BWP switches on one NR cell in scenario 1-3, the switch may cause an interruption to other serving cells (e.g., either LTE cells or NR cells) due to RF tuning/re-tuning. For the inter-band cases within FR1/FR2 (e.g., case 1, case 2, case 5, and case 8 above), BWP switching for reconfiguration scenarios 1-3 may also cause interruptions. For BWP switching in reconfiguration scenario 4, where only the SCS changes, there could be a remapping of base-band resources (which may also cause interruptions).

In summary, for case 4 and case 7, BWP switching in one FR may not cause interruptions to another FR; for other cases BWP switching in scenarios 1-3 may cause interruptions. The results regarding interruption due to BWP switching is summarized below in Table 3.

TABLE 3

Interruptions due to BWP switching

| Index | BWP switching interruption in EN-DC or NR CA | | Interruption |
|---|---|---|---|
| 1 | FR1 to LTE inter-band | Yes | Scenario 1/2/3 |
|   |   | No | Scenario 4 |
| 2 | FR1 to LTE intra-band | Yes | Scenario 1/2/3 |
|   |   | No | Scenario 4 |
| 3 | FR1 to FR1 inter-band | Yes | Scenario 1/2/3 |
|   |   | No | Scenario 4 |
| 4 | FR1 to FR1 intra-band | Yes | Scenario 1/2/3 |
|   |   | No | Scenario 4 |
| 5 | FR1 to FR2 | No | Scenario 1/2/3 |

TABLE 3-continued

Interruptions due to BWP switching

| Index | BWP switching interruption in EN-DC or NR CA | | Interruption |
|---|---|---|---|
|   |   | No | Scenario 4 |
| 6 | FR2 to FR2 inter-band | Yes | Scenario 1/2/3 |
|   |   | No | Scenario 4 |
| 7 | FR2 to FR2 intra-band | Yes | Scenario 1/2/3 |
|   |   | No | Scenario 4 |
| 8 | FR2 to FR1 | No | Scenario 1/2/3 |
|   |   | No | Scenario 4 |
| 9 | FR2 to LTE | Yes | Scenario 1/2/3 |
|   |   | No | Scenario 4 |

In some embodiments, the BWP switching may only involve baseband parameter(s) changing for BWP configuration, without changing Oscillator (LO), RF BW or SCS. In some embodiments, the BWP configuration parameters may include:
  a subcarrier spacing provided by higher layer parameter DL-BWP-mu or UL-BWP-mu;
  a cyclic prefix provided by higher layer parameter DL-BWP-CP or UL-BWP-CP;
  a Physical Resource Block (PRB) offset with respect to the PRB determined by higher layer parameters offset-pointA-low-scs and ref-scs and a number of contiguous PRBs provided by higher layer parameter DL-BWP-BW or UL-BWP-BW;
  an index in the set of DL BWPs or UL BWPs by respective higher layer parameters DL-BWP-index or UL-BWP-index.

In some embodiments, DCI format 1_0 or DCI format 1_1 perform detection to a PDSCH reception timing values by higher layer parameter DL-data-time-domain. In some embodiments, PDSCH reception to a Hybrid Automatic Repeat reQuest (HARQ)-ACKnowledgment (ACK) transmission timing values is performed by higher layer parameter DL-data-DL-acknowledgement. In some embodiments, DCI format 0_0 or DCI format 0_1 detection to a PUSCH transmission timing values is performed by higher layer parameter UL-data-time.

Thus the baseband parameters other than SCS related to BWP configuration are CP, BWP index and DCI format. These parameters for baseband processing are independent of BWP switching, therefore they may not cause interruptions.

In some embodiments, BWP switching may involve a change in only baseband parameter(s) without changing LO, RF BW or SCS, and may not cause any interruption to other serving cells, which is similar to BWP switching in scenario 4.

In some embodiments, BWP switching on one NR cell in FR1 for the BWP reconfiguration scenarios 1-3 may:
  cause interruptions to other serving LTE cells and NR cells in FR1.
  not cause interruptions to other serving NR cells in FR2. BWP switching on one NR cell in FR2 for the BWP reconfiguration scenarios 1-3
  cause interruptions to other serving NR cells in FR2.
  not cause interruptions to other serving NR cells in FR1 and LTE cells.

In some embodiments, BWP switching on one NR cell for the BWP reconfiguration scenarios 4 may not cause interruptions to other serving LTE or NR cells.

Figure 5:
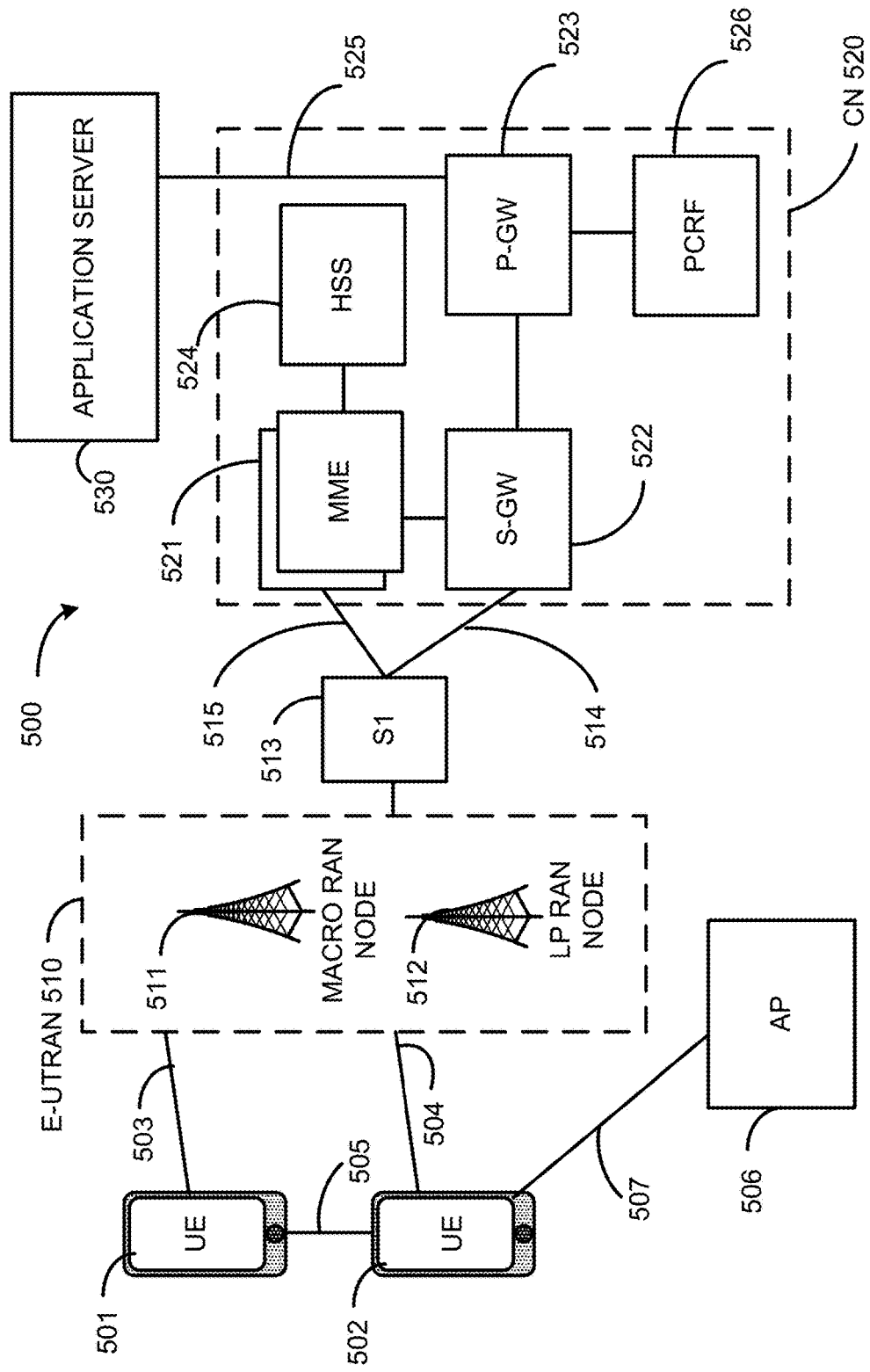
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520 via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
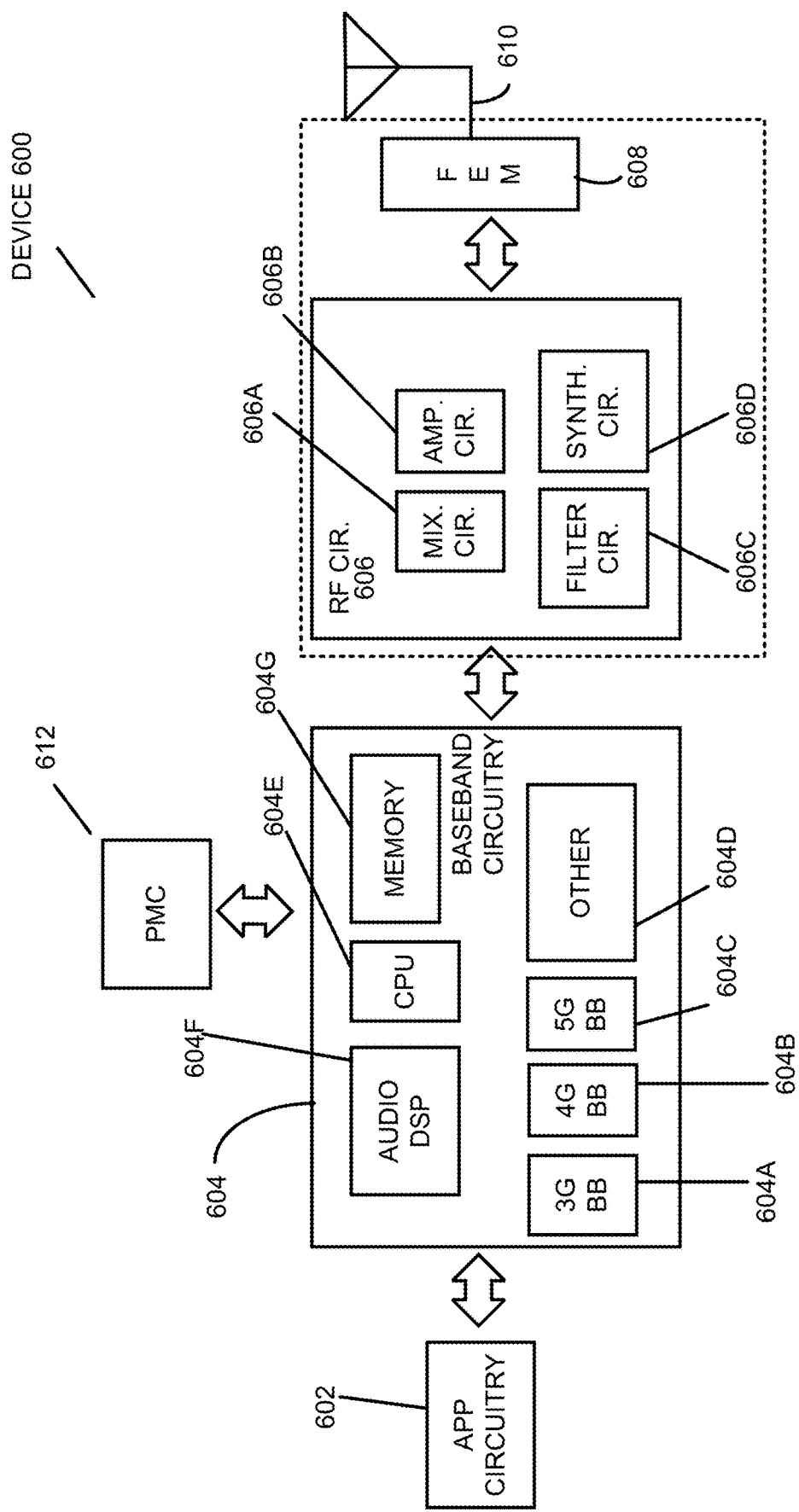
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
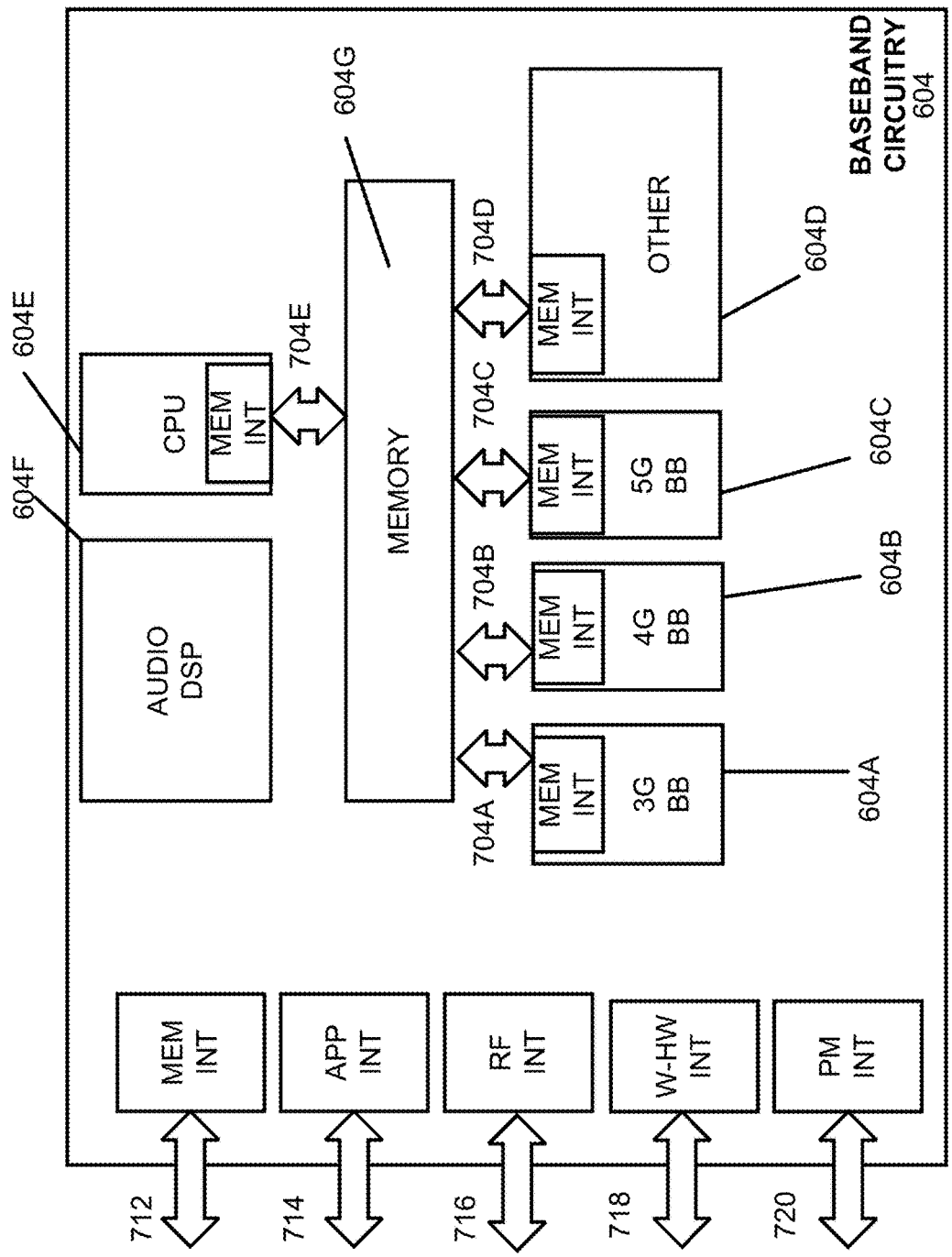
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
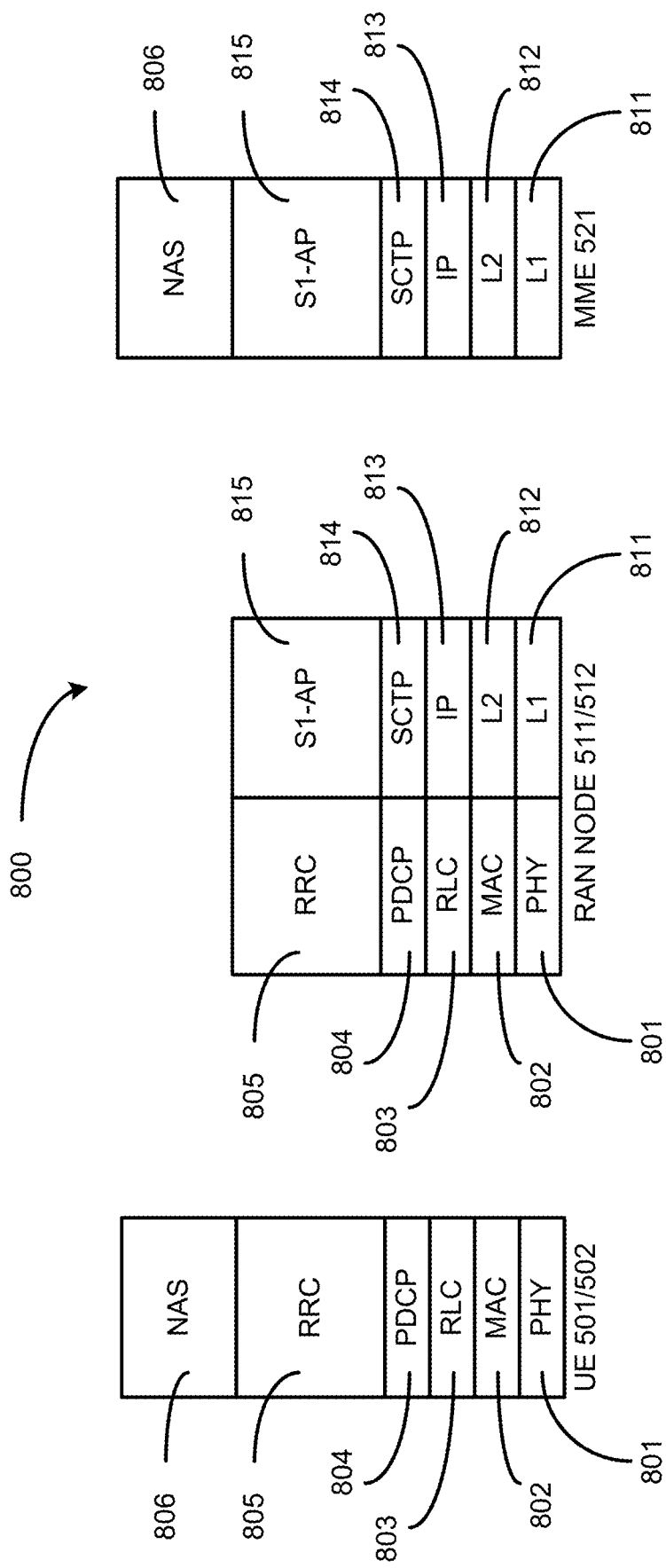
FIG. 8 is an illustration of a control plane protocol stack in accordance with some embodiments.

FIG. 8 is an illustration of a control plane protocol stack in accordance with some embodiments. In this embodiment, a control plane 800 is shown as a communications protocol stack between the UE 501 (or alternatively, the UE 502), the RAN node 511 (or alternatively, the RAN node 512), and the MME 521.

The PHY layer 801 may transmit or receive information used by the MAC layer 802 over one or more air interfaces. The PHY layer 801 may further perform link adaptation or adaptive modulation and coding (AMC), power control, cell search (e.g., for initial synchronization and handover purposes), and other measurements used by higher layers, such as the RRC layer 805. The PHY layer 801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 803 may operate in a plurality of modes of operation, including: Transparent Mode (TM), Unacknowledged Mode (UM), and Acknowledged Mode (AM). The RLC layer 803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 801, the MAC layer 802, the RLC layer 803, the PDCP layer 804, and the RRC layer 805.

The non-access stratum (NAS) protocols 806 form the highest stratum of the control plane between the UE 501 and the MME 521. The NAS protocols 806 support the mobility of the UE 501 and the session management procedures to establish and maintain IP connectivity between the UE 501 and the P-GW 523.

The S1 Application Protocol (S1-AP) layer 815 may support the functions of the S1 interface and comprise Elementary Procedures (EPs). An EP is a unit of interaction between the RAN node 511 and the CN 520. The S1-AP layer services may comprise two groups: UE-associated services and non-UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 814 may ensure reliable delivery of signaling messages between the RAN node 511 and the MME 521 based, in part, on the IP protocol, supported by the IP layer 813. The L2 layer 812 and the L1 layer 811 may refer to communication links (e.g., wired or wireless) used by the RAN node and the MME to exchange information.

The RAN node 511 and the MME 521 may utilize an S1-MME interface to exchange control plane data via a protocol stack comprising the L1 layer 811, the L2 layer 812, the IP layer 813, the SCTP layer 814, and the S1-AP layer 815.

Figure 9:
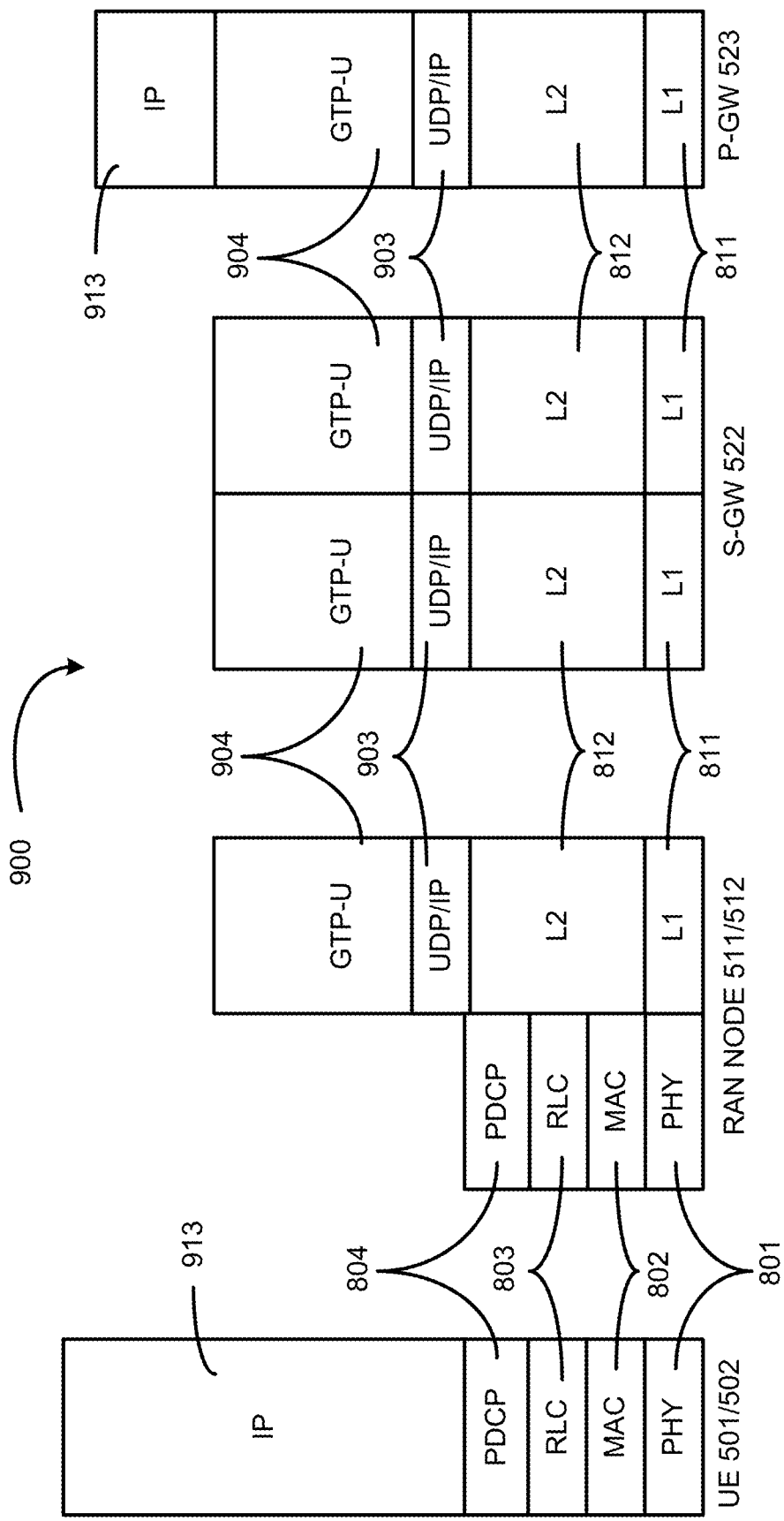
FIG. 9 is an illustration of a user plane protocol stack in accordance with some embodiments.

FIG. 9 is an illustration of a user plane protocol stack in accordance with some embodiments. In this embodiment, a user plane 900 is shown as a communications protocol stack between the UE 501 (or alternatively, the UE 502), the RAN node 511 (or alternatively, the RAN node 512), the S-GW 522, and the P-GW 523. The user plane 900 may utilize at least some of the same protocol layers as the control plane 800. For example, the UE 501 and the RAN node 511 may utilize a Uu interface (e.g., an LTE-Uu interface) to exchange user plane data via a protocol stack comprising the PHY layer 801, the MAC layer 802, the RLC layer 803, the PDCP layer 804.

The General Packet Radio Service (GPRS) Tunneling Protocol for the user plane (GTP-U) layer 904 may be used for carrying user data within the GPRS core network and between the radio access network and the core network. The user data transported can be packets in any of IPv4, IPv6, or PPP formats, for example. The UDP and IP security (UDP/IP) layer 913 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 811, the L2 layer 812, the UDP/IP layer 913, and the GTP-U layer 904. The S-GW 522 and the P-GW 523 may utilize an S5/S8a interface to exchange user plane data via a protocol stack comprising the L1 layer 811, the L2 layer 812, the UDP/IP layer 913, and the GTP-U layer 904. As discussed above with respect to FIG. 8, NAS protocols support the mobility of the UE 501 and the session management procedures to establish and maintain IP connectivity between the UE 501 and the P-GW 523.

Figure 10:
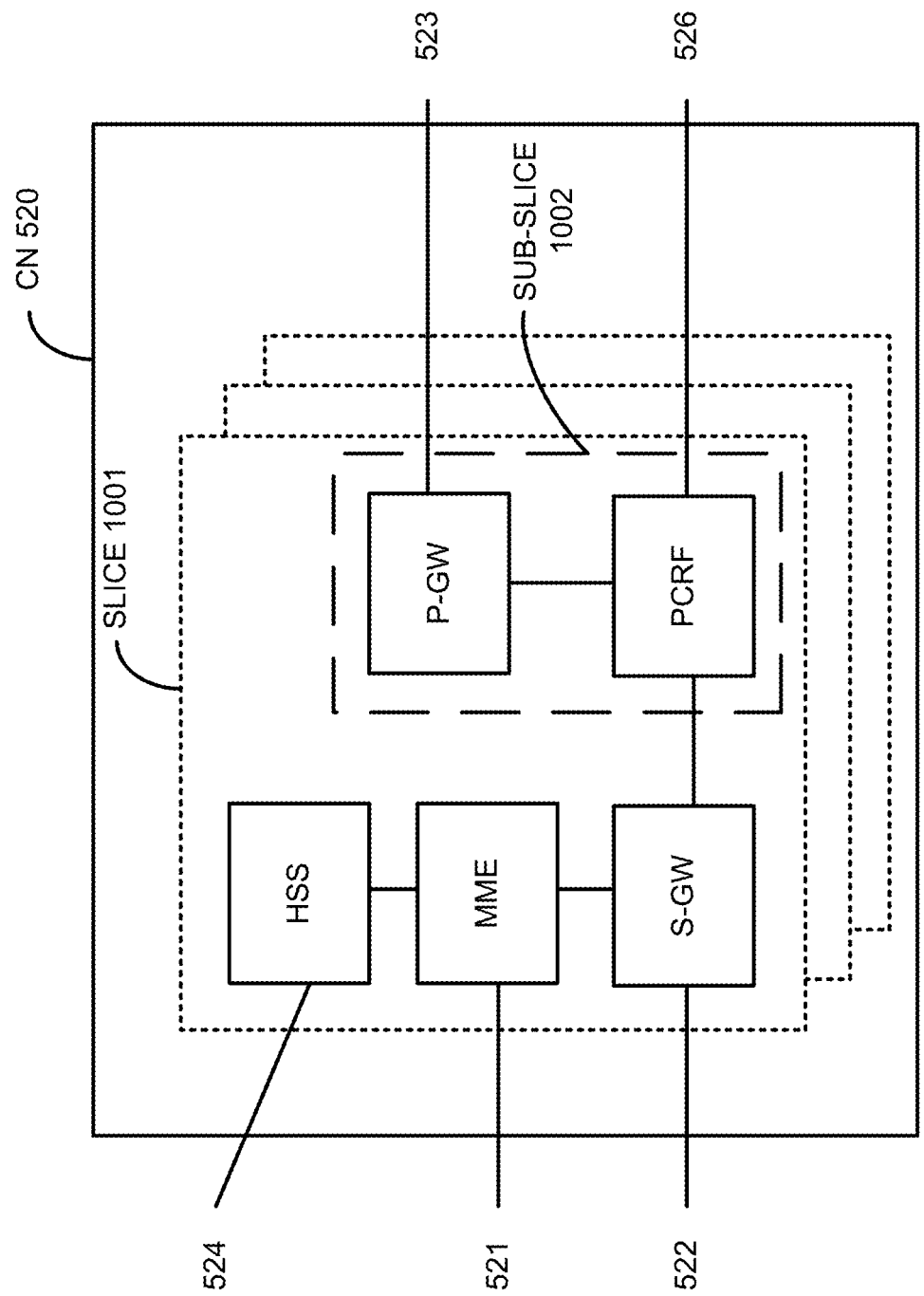
FIG. 10 illustrates components of a core network in accordance with some embodiments.

FIG. 10 illustrates components of a core network in accordance with some embodiments. The components of the CN 520 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 520 may be referred to as a network slice 1001. A logical instantiation of a portion of the CN 520 may be referred to as a network sub-slice 1002 (e.g., the network sub-slice 1002 is shown to include the PGW 523 and the PCRF 526).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
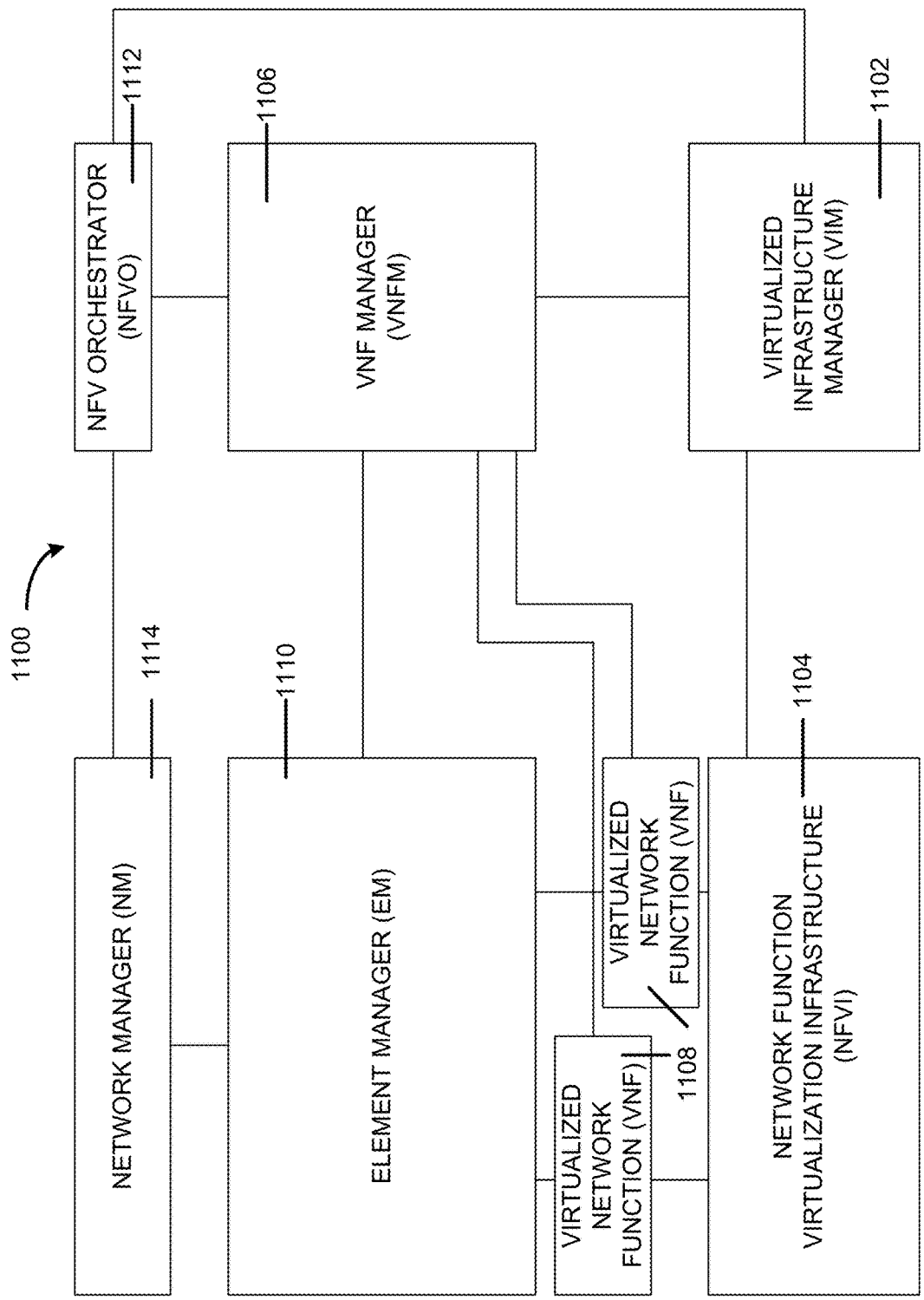
FIG. 11 is a block diagram illustrating components, according to some embodiments, of a system to support network function virtualization (NFV).

FIG. 11 is a block diagram illustrating components, according to some example embodiments, of a system 1100 to support NFV. The system 1100 is illustrated as including a virtualized infrastructure manager (VIM) 1102, a network function virtualization infrastructure (NFVI) 1104, a VNF manager (VNFM) 1106, virtualized network functions (VNFs) 1108, an element manager (EM) 1110, an NFV Orchestrator (NFVO) 1112, and a network manager (NM) 1114.

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNFs 1108. The VNFs 1108 may be used to execute EPC components/functions. The VNFM 1106 may manage the life cycle of the VNFs 1108 and track performance, fault and security of the virtual aspects of VNFs 1108. The EM 1110 may track the performance, fault and security of the functional aspects of VNFs 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
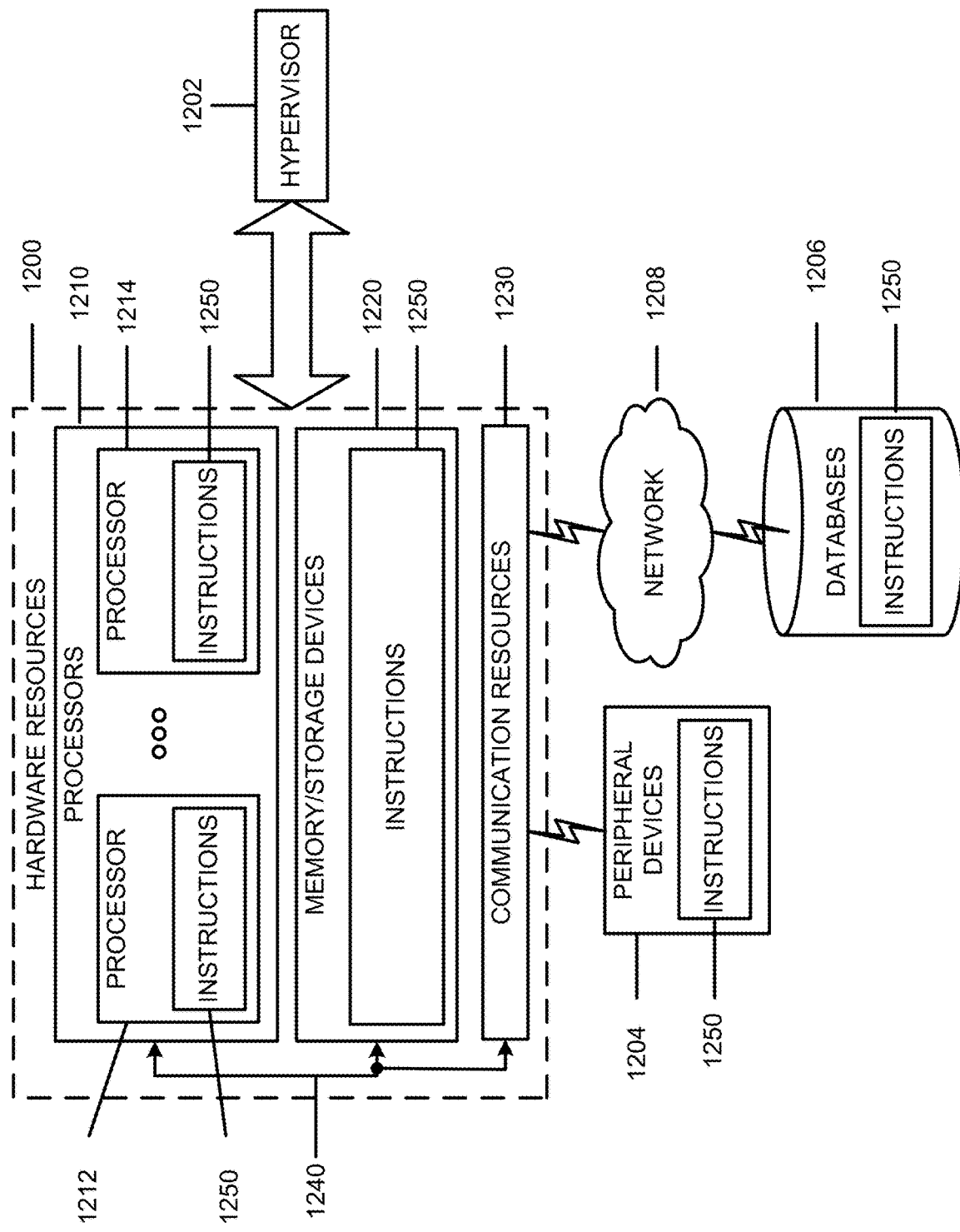
FIG. 12 depicts a block diagram illustrating components, according to some embodiments, able to read instructions from a machine-readable or computer-readable medium (e.g., a non-transitory machine-readable storage medium) and perform any one or more of the methodologies discussed herein.
Figure 13:
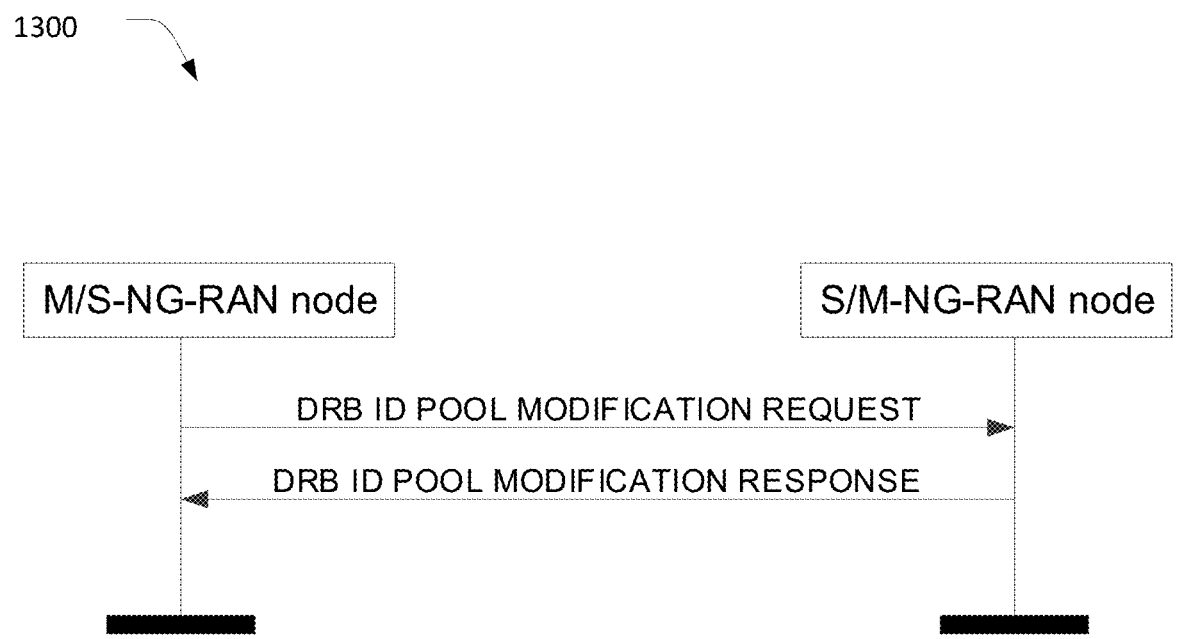
FIG. 13 illustrates an example of DRB ID pool modification according to various embodiments.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

In various embodiments, the devices/components of FIGS. 5, 6, 8, 9, 10, 11, 12, and particularly the baseband circuitry of FIG. 7, may be used for: retrieving BWP configuration information from memory, the BWP configuration information for indicating a number of slots for a BWP switch delay; generating a message that includes the BWP configuration information; and encoding the message for transmission to a user equipment (UE). The devices/components of FIGS. 5-12 may also be used to practice, in whole or in part, any of the operation flow/algorithmic structures depicted in FIGS. 1-3.

One example of an operation flow/algorithmic structure is depicted in FIG. 1, which may be performed by a next-generation NodeB (gNB) in accordance with some embodiments. In this example, operation flow/algorithmic structure 100 may include, at 105, retrieving BWP configuration information stored in a memory, the BW configuration information for indicating a number of slots for a BWP switch delay. Operation flow/algorithmic structure 100 may further include, at 110, generating a message that includes the BWP configuration information. Operation flow/algorithmic structure 100 may further include, at 115, encoding the message for transmission to a user equipment (UE).

In some embodiments, the message is to be transmitted via radio resource control (RRC) signaling. In some embodiments, the number of slots for the BWP switch delay correspond to a largest subcarrier spacing (SCS) from a first SCS before BWP switching (SCS1) and a second SCS after BWP switching (SCS2).

In some embodiments, the BWP configuration information indicates a change of a center frequency of a BWP without a change of a bandwidth (BW) of the BWP. In some embodiments, the BWP configuration information indicates a change of a BW of a BWP without a change of a center frequency of the BWP. In some embodiments, the BWP configuration information indicates a change of a BW of a BWP and a center frequency of the BWP.

In some embodiments, the BWP configuration information indicates a change of an SCS. In some embodiments, the BWP configuration information indicates that a center frequency of a BWP and a BW of the BWP is to remain unchanged.

Figure 2:

Another example of an operation flow/algorithmic structure is depicted in FIG. 2, which may be performed by UE in accordance with some embodiments. In this example, operation flow/algorithmic structure 200 may include, at 205, receiving a message comprising bandwidth part (BWP) configuration information, the BWP configuration information for indicating a number of slots for a BWP switch delay. Operation flow/algorithmic structure 200 may further include, at 210, performing a BWP switch based on the BWP configuration information. In some embodiments, the operation flow/algorithmic structure may further comprise: receiving a downlink control information (DCI) command; and performing the BWP switch based on the DCI command.

In some embodiments, the BWP switch causes an interruption to one or more serving cells. Alternatively, the BWP switch does not cause an interruption to one or more serving cells. In some embodiments, the BWP switch causes an interruption to a first serving cell in a first frequency range and does not cause an interruption to a second serving cell in a second frequency range. In some embodiments, the first frequency range (FR1) is 450 MHz to 6000 MHz, and the second frequency range (FR2) is 24250 MHz to 52600 MHz.

Another example of an operation flow/algorithmic structure is depicted in FIG. 3, which may be performed by gNB in accordance with some embodiments. In this example, operation flow/algorithmic structure 300 may include, at 305, generating a first message comprising an initial bandwidth part (BWP) configuration. Operation flow/algorithmic structure 300 may further include, at 310, encoding the first message for transmission to a user equipment (UE). Operation flow/algorithmic structure 300 may further include, at 315, generating a second message comprising BWP reconfiguration information, the BWP reconfiguration information for indicating a number of slots for a BWP switch delay. Operation flow/algorithmic structure 300 may further include, at 320, encoding the second message for transmission to the UE. In some embodiments, the operation flow/algorithmic structure may further include: generating a DCI command message to initiate the BWP switch; and encoding the DCI command message for transmission to the UE.

In some embodiments, the second message is to be transmitted via radio resource control (RRC) signaling. In some embodiments, the number of slots for the BWP switch delay correspond to a largest subcarrier spacing (SCS) from a first SCS before BWP switching (SCS1) and a second SCS after BWP switching (SCS2). In some embodiments, the BWP configuration information is to indicate a change of a BW of a BWP or a center frequency of the BWP. In some embodiments, the BWP configuration information is to indicate a change of an SCS.

EXAMPLES

Some non-limiting examples are provided below.

Example 1 includes an apparatus comprising: memory to store a bandwidth part (BWP) configuration information for indicating a number of slots for a BWP switch delay; and processing circuitry, coupled with the memory, to: retrieve the BWP configuration information from the memory; generate a message that includes the BWP configuration information; and encode the message for transmission to a user equipment (UE).

Example 2 includes the apparatus of example 1 and/or some other examples herein, wherein the message is to be transmitted via radio resource control (RRC) signaling.

Example 3 includes the apparatus of example 1 and/or some other examples herein, wherein the number of slots for the BWP switch delay correspond to a largest subcarrier spacing (SCS) from a first SCS before BWP switching (SCS1) and a second SCS after BWP switching (SCS2).

Example 4 includes the apparatus of example 1 and/or some other examples herein, wherein the BWP configuration information indicates a change of a center frequency of a BWP without a change of a bandwidth (BW) of the BWP.

Example 5 includes the apparatus of example 1 and/or some other examples herein, wherein the BWP configuration information indicates a change of a BW of a BWP without a change of a center frequency of the BWP.

Example 6 includes the apparatus of example 1 and/or some other examples herein, wherein the BWP configuration information indicates a change of a BW of a BWP and a center frequency of the BWP.

Example 7 includes the apparatus of example 1 and/or some other examples herein, wherein the BWP configuration information indicates a change of an SCS.

Example 8 includes the apparatus of example 1 and/or some other examples herein, wherein the BWP configuration information indicates that a center frequency of a BWP and a BW of the BWP is to remain unchanged.

Example 9 includes one or more non-transitory, computer-readable media storing instructions, that, when executed by one or more processors, cause a user equipment (UE) to: receive a message comprising bandwidth part (BWP) configuration information, the BWP configuration information for indicating a number of slots for a BWP switch delay; and perform a BWP switch based on the BWP configuration information.

Example 10 includes the one or more non-transitory computer-readable media of example 9 and/or some other examples herein, wherein the instructions are further to cause the UE to: receive a downlink control information (DCI) command; and perform the BWP switch based on the DCI command.

Example 11 includes the one or more non-transitory computer-readable media of example 9 and/or some other examples herein, wherein the BWP switch causes an interruption to one or more serving cells.

Example 12 includes the one or more non-transitory computer-readable media of example 9 and/or some other examples herein, wherein the BWP switch does not cause an interruption to one or more serving cells.

Example 13 includes the one or more non-transitory computer-readable media of example 9 and/or some other examples herein, wherein the BWP switch causes an interruption to a first serving cell in a first frequency range and does not cause an interruption to a second serving cell in a second frequency range.

Example 14 includes the one or more non-transitory computer-readable media of example 13 and/or some other examples herein, wherein the first frequency range (FR1) is 450 MHz to 6000 MHz, and wherein the second frequency range (FR2) is 24250 MHz to 52600 MHz.

Example 15 includes one or more non-transitory, computer-readable media storing instructions, that, when executed by one or more processors, cause a next-generation NodeB (gNB) to: generate a first message comprising an initial bandwidth part (BWP) configuration; encode the first message for transmission to a user equipment (UE); generate a second message comprising BWP reconfiguration information, the BWP reconfiguration information for indicating a number of slots for a BWP switch delay; and encode the second message for transmission to the UE.

Example 16 includes the one or more non-transitory computer-readable media of example 15 and/or some other examples herein, wherein the media further stores instructions for causing the gNB to: generate a DCI command message to initiate the BWP switch; and encode the DCI command message for transmission to the UE.

Example 17 includes the one or more non-transitory computer-readable media of example 15 and/or some other examples herein, wherein the second message is to be transmitted via radio resource control (RRC) signaling.

Example 18 includes the one or more non-transitory computer-readable media of example 15 and/or some other examples herein, wherein the number of slots for the BWP switch delay correspond to a largest subcarrier spacing (SCS) from a first SCS before BWP switching (SCS1) and a second SCS after BWP switching (SCS2).

Example 19 includes the one or more non-transitory computer-readable media of example 15 and/or some other examples herein, wherein the BWP configuration information is to indicate a change of a BW of a BWP or a center frequency of the BWP.

Example 20 includes the one or more non-transitory computer-readable media of example 15 and/or some other examples herein, wherein the BWP configuration information is to indicate a change of an SCS.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An apparatus comprising:
a memory to store a bandwidth part (BWP) configuration information for indicating a length of an interruption time for a BWP switch delay for a BWP switch, wherein the length of the interruption time is represented by a number of slots, and the interruption time does not occupy a symbol for a Demodulation Reference Signal (DMRS), wherein the BWP switch comprises changing a cyclic prefix based on a higher layer parameter; and
processing circuitry, coupled with the memory, to:
retrieve the BWP configuration information from the memory;
generate a message that includes the BWP configuration information; and
encode the message for transmission to a user equipment (UE).

2. The apparatus of claim 1, wherein the message is to be transmitted via radio resource control (RRC) signaling.

3. The apparatus of claim 1, wherein the number of slots for the BWP switch delay correspond to a largest subcarrier spacing (SCS) from a first SCS before BWP switching (SCS1) and a second SCS after BWP switching (SCS2).

4. The apparatus of claim 1, wherein the BWP configuration information indicates a change of a center frequency of a BWP without a change of a bandwidth (BW) of the BWP.

5. The apparatus of claim 1, wherein the BWP configuration information indicates a change of a BW of a BWP without a change of a center frequency of the BWP.

6. The apparatus of claim 1, wherein the BWP configuration information indicates a change of a BW of a BWP and a center frequency of the BWP.

7. The apparatus of claim 1, wherein the BWP configuration information indicates a change of subcarrier spacing (SCS).

8. The apparatus of claim 7, wherein the BWP configuration information indicates that a center frequency of a BWP and a BW of the BWP is to remain unchanged.

9. One or more non-transitory, computer-readable media storing instructions, that, when executed by one or more processors, cause a user equipment (UE) to:
receive a message comprising bandwidth part (BWP) configuration information, the BWP configuration information indicating a length of an interruption time for a BWP switch delay for a BWP switch, wherein the length of the interruption time is represented by a number of slots, and the interruption time does not occupy a symbol for a Demodulation Reference Signal (DMRS), wherein the BWP switch comprises changing a cyclic prefix based on a higher layer parameter; and
perform the BWP switch based on the BWP configuration information.

10. The one or more non-transitory, computer-readable media of claim 9, wherein the instructions are further to cause the UE to:
receive a downlink control information (DCI) command; and
perform the BWP switch based on the DCI command.

11. The one or more non-transitory, computer-readable media of claim 9, wherein the BWP switch causes an interruption to one or more serving cells.

12. The one or more non-transitory, computer-readable media of claim 9, wherein the BWP switch does not cause an interruption to one or more serving cells.

13. The one or more non-transitory, computer-readable media of claim 9, wherein the BWP switch causes an interruption to a first serving cell in a first frequency range and does not cause an interruption to a second serving cell in a second frequency range.

14. The one or more non-transitory, computer-readable media of claim 13, wherein the first frequency range (FR1) is 450 MHz to 6000 MHz, and wherein the second frequency range (FR2) is 24250 MHz to 52600 MHz.

15. One or more non-transitory, computer-readable media storing instructions, that, when executed by one or more processors, cause a base station to:
generate a first message comprising an initial bandwidth part (BWP) configuration;
encode the first message for transmission to a user equipment (UE);
generate a second message comprising BWP reconfiguration information, the BWP reconfiguration information for indicating a length of an interruption time for a BWP switch delay for a BWP switch, wherein the length of the interruption time is represented by a number of slots, and the interruption time does not occupy a symbol for a Demodulation Reference Signal (DMRS), wherein the BWP switch comprises changing a cyclic prefix based on a higher layer parameter; and
encode the second message for transmission to the UE.

16. The one or more non-transitory, computer-readable media of claim 15, wherein the media further stores instructions for causing the base station to:
generate a DCI command message to initiate the BWP switch; and
encode the DCI command message for transmission to the UE.

17. The one or more non-transitory, computer-readable media of claim 15, wherein the second message is to be transmitted via radio resource control (RRC) signaling.

18. The one or more non-transitory, computer-readable media of claim 15, wherein the number of slots for the BWP switch delay correspond to a largest subcarrier spacing (SCS) from a first SCS before BWP switching (SCS1) and a second SCS after BWP switching (SCS2).

19. The one or more non-transitory, computer-readable media of claim 15, wherein the BWP configuration information is to indicate a change of a BW of a BWP or a center frequency of the BWP.

20. The one or more non-transitory, computer-readable media of claim 15, wherein the BWP configuration information is to indicate a change of subcarrier spacing (SCS).

* * * * *